United States Patent
Brun et al.

(10) Patent No.: US 8,753,722 B2
(45) Date of Patent: Jun. 17, 2014

(54) METHOD FOR COATING A METAL CRUCIBLE ELEMENT WITH A MIXTURE OF GLASS AND CERAMIC

(75) Inventors: Patrice Brun, Saint Michel d'Euzet (FR); Geoffroy Berard, Crevecoeur sur l'Escaut (FR); Jacques Lacombe, Pujaut (FR)

(73) Assignee: Areva NC, Paris (FR)

(*) Notice: Subject to any disclaimer, the term of this patent is extended or adjusted under 35 U.S.C. 154(b) by 64 days.

(21) Appl. No.: 13/129,368

(22) PCT Filed: Nov. 17, 2009

(86) PCT No.: PCT/EP2009/065336
§ 371 (c)(1),
(2), (4) Date: May 13, 2011

(87) PCT Pub. No.: WO2010/057894
PCT Pub. Date: May 27, 2010

(65) Prior Publication Data
US 2011/0217485 A1    Sep. 8, 2011

(30) Foreign Application Priority Data
Nov. 19, 2008  (FR) ..................... 08 57860

(51) Int. Cl.
*C23C 4/10*    (2006.01)
*C23C 4/06*    (2006.01)

(52) U.S. Cl.
USPC ........................ 427/446; 427/453; 427/455

(58) Field of Classification Search
USPC .............................. 427/446, 453
See application file for complete search history.

(56) References Cited

U.S. PATENT DOCUMENTS

| 3,837,894 A | 9/1974 | Tucker, Jr. |
| 2004/0023078 A1 | 2/2004 | Rosenflanz et al. |
| 2005/0056055 A1 | 3/2005 | Celikkaya et al. |
| 2005/0129087 A1 * | 6/2005 | Brun et al. ..................... 373/155 |

FOREIGN PATENT DOCUMENTS

| FR | 2484282 | 12/1981 |
| FR | 2835601 | 8/2003 |
| WO | WO 02/18128 A1 | 3/2002 |
| WO | WO 03/067166 A2 | 8/2003 |
| WO | WO03067166 A2 * | 8/2003 |

OTHER PUBLICATIONS

International Search Report and Written Opinion in International Application No. PCT/EP2009/065336, mailed Apr. 27, 2010.
International Preliminary Report on Patentability in International Application No. PCT/EP2009/065336, mailed Jun. 3, 2011.
Bolelli, G., "BAS, CMAS and CZAS Glass Coatings Deposited by Plasma Spraying," Journal of the European Ceramic Society, vol. 27, Issue 16, 2007, pp. 4575-4588.
Bolelli, G., "Glass-Alumina Composite Coatings by Plasma Spraying. Part I: Microstructural and Mechanical Characterization," Surface & Coating Technology, 2005, 16 pages.
Zhang, T. et al., "Temperature Profiles and Thermal Stress Analysis of Plasma Sprayed Glass-Composite Coatings," Thermal Spray 2000: Surface Engineering via Applied Research (ASM International), 2000, pp. 355-361.

* cited by examiner

*Primary Examiner* — Dah-Wei D Yuan
*Assistant Examiner* — Nga Leung V Law
(74) *Attorney, Agent, or Firm* — Nixon Peabody LLP

(57) ABSTRACT

Angular sectors of a cylindrical wall of a crucible for vitrification of waste, built in steel and subject to high temperatures, are coated with a mixture of mainly glass and ceramic, the coating being subject to a heat treatment comprising a step between 650° C. and 850° C. so as to perform surface melting of the mixture filling the open porosity, improving dielectric strength and the cohesion of the coating, but without producing any excessive thermal expansion or oxidation of the substrate which would lead to fast flaking of the coating.

8 Claims, No Drawings

METHOD FOR COATING A METAL CRUCIBLE ELEMENT WITH A MIXTURE OF GLASS AND CERAMIC

CROSS REFERENCE TO RELATED APPLICATIONS OR PRIORITY CLAIM

This application is a National Phase of PCT/EP2009/065336, filed Nov. 17, 2009, entitled, "METHOD FOR COATING A METAL CRUCIBLE MEMBER WITH A GLASS AND CERAMIC MIXTURE", and which claims priority of, French Patent Application No. 08 57860, filed Nov. 19, 2008, the contents of which are incorporated herein by reference in their entirety.

The object of this invention is a method for coating a metal crucible, as well as an element of such a crucible.

It was especially designed for crucibles used in vitrification methods with high temperature induction heating for the load of the crucible, where the crucible is cooled. Such crucibles are used for elaborating glasses from oxides, incinerating nuclear organic waste with low and medium activity on a bath of molten glass, and vitrifying nuclear waste or nuclear liquid effluents with high, medium and low activity. The crucibles are placed on a refractory concrete sole and placed in a magnetic field produced by an inductor in which flows a high frequency electric current, which generates heating of the load of the crucibles. The cylindrical wall of the crucibles, advantageously in metal, is subject to significant heating because of the molten load which it includes and to evolvements due to the induced currents which it experiences. This is why a cooling circuit is pierced in the wall of the crucible. However, the currents induced in the wall have to be limited not only for reducing the heating but also for increasing direct electromagnetic coupling between the inductor and the contents of the crucible. The wall then consists of the assembly of vertical sectors assembled by their transverse face in the fashion of staves of a barrel, with an electric insulator between each pair of adjacent elements. This electric insulator is generally mica. The sectors of the crucible are generally assembled by welding them to each other in the high portion, above the inductor, or by screwing them onto an upper flange; they may also be maintained by a hoop at the external periphery, with glass fabric impregnated with an elastomer or epoxy resin.

PRIOR ART

Document FR-A-2 835 601 teaches that the electric insulation protection may be reinforced by depositing a ceramic coating on at least one portion of the surface of the crucible, like the inner face or the side faces of the sectors. Ceramics are refractory elements with crystalline structure, melting at a temperature above that of the metal of the crucible. The service of the crucible is then satisfactory in most cases in spite of the difficult conditions of high temperature and often a very corrosive atmosphere. Nevertheless, certain circumstances for applying the method have difficulties. This is notably the case when a significant amount of liquid (acids, water, liquid waste) lies at the surface of the glass bath, such as upon the arrival of liquid effluents into the load to be vitrified, while cooling of the sectors generally ensures the preservation of a solidified layer of the load in contact with the wall of the crucible, which is not only less hot than the remainder of the load but also less aggressive. Now ceramic coatings are porous as soon as they are made and are then subject to cracking or even to temperature checking by the thermal shocks which they undergo. This porosity allows percolation of the gases produced upon vitrification and especially of the liquids occasionally present in large volumes above the glass in the ceramic layer, which causes a reduction in electric rigidity of the layer on the one hand and possibly corrosion of the substrate which it coats, on the other hand. The ceramic layer may even flake off until it disappears.

Increasing the thickness of the ceramic layer increases its open porosity and its dielectric rigidity, but this is not suitable here because of the high temperature gradients encountered between the load and the cooled sectors and of the corresponding thermal expansion differences, notably along the sectors in the vertical direction, which would destroy thick ceramic layers.

Interest also grew in coatings consisting of a mixture of glass and ceramic, instead of pure ceramic. The expectation was to benefit from the lower melting temperature of the glass for filling the interstices of the ceramic therefore reducing its porosity during the projection, or even for further reducing this porosity by a subsequent annealing treatment of the part by making the glass viscous; the expectation was also to benefit from its higher expansion coefficient than that of the ceramic in order to bring the overall expansion coefficient of the coating closer to the higher one of the substrate.

Work prior to the invention, confirmed by that of the authors thereof, has however demonstrated that the objective of reducing porosity was difficult to achieve.

Work by Manfredini ("Glass-alumina composite coatings by plasma spraying, Part I: microstructural and mechanical characterization", Surface & Coating Technology [2005]), moreover for ceramic substrates, has thus demonstrated that the 1,000° C. heat treatment assumed to rearrange the structure of the coating by infiltration of the glass which has become viscous in reality had no effect on the porosity of the coating and on its mechanical strength, and might even become harmful. Reasons would be a phase transformation of the ceramic (alumina), which contracts from a metastable gamma phase to a stable alpha phase through metastable intermediate delta and kappa states, and expansion of the air bubbles trapped in the coating. Lowering of the mechanical strength of the coating was also noticed, except for contents of about 80% of alumina and about 20% of glass.

The application of such heat treatment methods to identical coatings but deposited on stainless steel substrates may also have other detrimental effects, as the inventors noticed, i.e. oxidation of the substrate by a redox chemical reaction with glass, by which the iron of the substrate is oxidized and the glass decomposes through a reduction of some of its oxides, with catastrophic consequences on the cohesion and strength of the coating.

Mention may also be made of the work of Zhang ("Temperature profiles and thermal stress analysis of plasma sprayed glass-composite coatings", Thermal spray: surface engineering via applied research, edited by C. Berndt, ASM Thermal Spray Society, German Welding Society (DUS) and International Institute of Welding (IIW), ISBN 0-87170-680-6, SAN: 204-7986 (2000), 355-361), which teach that the stresses internal to the composite coating may be relaxed by selecting a glass with a low glassy transition temperature and a high linear expansion coefficient. Glasses having a glassy transition temperature below 500° C. are considered. The effects on the porosity of the coating are however not mentioned, and the inventors were able to establish that there were not any effects, by reproducing these tests, and that the micrographic structure of the coating was not modified appreciably.

Document US-A-2004/0023078 describes an abrasive coating consisting of hard particles coated in an amorphous matrix. The coating is projected via a plasma subject to a heat treatment at a high temperature, 1,300° for example.

Document WO-A-02/18128 describes a composite coating in a glassy material and in a crystalline material, where crystallization is produced after a heat treatment from 1,100° C. to at least 1,200° C.

DISCUSSION OF THE INVENTION

An object of the invention is therefore to propose a coating of metal sectors of a cooled crucible wall meeting the usual requirements of dielectric strength and resistance to corrosion and temperature but which does not include the drawback of excessive open porosity promoting percolation of liquids present on the molten load.

This coating should moreover resist to the encountered chemicals, such as nitrates, chlorides, sulfates, molybdates, etc., depending on the treated waste. In current applications to radioactive waste, it should also resist to their radiation. Finally, it should of course be physically and chemically compatible with the substrate which it coats, i.e. it should manage to adhere to it, have a not very different thermal expansion and not react with it.

Traditional coatings in this technical field of induction furnaces are in ceramic and notably in alumina, mullite, alumina-rutile or other materials. The method for applying these coatings is generally projection via a plasma. The layer elaborated by plasma projection has an open interconnected porosity in the whole of its volume.

The invention in its most general form relates to a method for coating sectors of a vitrification crucible, the sectors being in steel, characterized in that it consists of applying a mixture of glass and ceramic on the sectors, and of submitting the mixture to a heat treatment, the mixture having a composition of 50% to 70% by mass of glass having a glassy transition temperature below 650° C., and of 30% to 50% by mass of ceramic, and the heat treatment being conducted at a maximum temperature which is greater than a pour temperature of the mixture, and comprised between 650° C. and 850° C.

The invention therefore lies in the combination of a particular composition of the coating and of a low heat treatment temperature, but associated with a glass for which the glassy transition temperature is even lower.

The open interconnected porosity in the whole volume of the total after projection via a plasma is totally eliminated by the heat treatment. The latter makes the glass viscous and densifies the porous architecture of the coating. However, the coating is not dense since it will have a closed porosity due to expansion of the air trapped in the coating. This porosity is not a nuisance since it is localized in the coating and does not allow percolation of chemical species and is not detrimental to the mechanical properties, if, of course, it remains under control.

A composition of 30% ceramic and 70% glass based on the mass of the mixture has given good results.

According to a first aspect, the invention relates to the composition of the coating. The glass has a mass proportion comprised between about 50% and 70%, the balance being ceramic. The ceramic provides the mechanical strength to the coating, and the glass the capability of withstanding delaminations or flakings produced by the thermal expansion differences. With different distributions, notably equal parts of glass and of ceramic, resistance to delamination would be too low, notably on the edges of the coated part, which may be explained by inhomogeneity of the microstructure of the coating. With a larger share of ceramic, the coating would have a lamellar structure essentially formed with alternating glass and ceramic layers, for which cohesion would be low. With the proportions of the invention, the coating assumes the form of a continuous glassy matrix surrounding isolated ceramic grains. The glassy matrix gives the sought cohesion to the coating and the ceramic grains further give the possibility of stopping microcracks which develop in the matrix as a result of the stresses suffered by the coating, which ensures the sought mechanical strength.

Under a second aspect, the invention relates to the heat treatment applied to the coating. Prior art investigations, conducted with high heat treatments (close to 1,000° C.), do not allow a reduction in the porosity of the coating. The inventors however discovered ranges of temperature with which this objective may be achieved and which depend on the following conditions.

a) First of all the mixture has to be made viscous in order to obtain infiltration of the glass into the pores of the coating. This is obtained at a pour temperature of the mixture somewhat greater than the glassy transition temperature of the glass, due to the presence of ceramic in the mixture, and which may be found by observing the temperature at which a drop of mixture spreads out.

b) Oxidation of the substrate should then be avoided, which imposes that heat treatment temperatures remain moderate at the interface between the coating and the substrate.

c) The temperature should also remain moderate in the actual coating, in order to avoid generating additional porosity by the expansion of the air bubbles trapped in the coating and by the changes of state of the ceramic.

The tests demonstrated that oxidation of the relevant steel by the glasses began at about 550° C. but that its progression was much faster at 650° C. and above. The heating processes at the interface between the coating and the substrate above this temperature of about 650° C. may therefore be tolerated only if they are short, heating to a lower temperature being preferable.

A satisfactory kind of heat treatment comprises glazing at a relatively high temperature comprised towards the top of the indicated range of temperatures, followed by quenching in air and by annealing located towards the bottom of this range, or even at a clearly lower temperature. Glazing performs melting of the free surface of the coating, and annealing improves the bottom of the coating with the objective of not oxidizing the substrate while resolving internal stresses. Glazing is brief, lasting a few minutes and at most about 15 minutes; it may be conducted between about 750° C. and 850° C.

In the case when glazing is performed, part of the heat provided to the coating will also be used for heating the bottom of the latter, so that annealing may be conducted below the temperature of 650° C., or even below 500° C. for example, i.e. close to the glassy transition temperature of the glass. This annealing step lasts for at least one hour, and possibly much longer.

Another kind of satisfactory heat treatment is similar to annealing by its duration, but it is undertaken alone without any glazing step, and at a temperature greater than the one which is considered here for annealing, more specifically in a range of temperatures comprised between about 650° C. and 750° C. As corrosion of the substrate has to be feared, this should be proceeded with under an inert atmosphere.

It is seen that the invention was designed by resolving, inter alia, the contradiction of having to heat the coating at the surface at a temperature at which the substrate would rapidly be oxidized.

EXEMPLARY EMBODIMENTS

I) 1° One was thus led to selecting glasses for which the glassy transition temperature Tg is less than about 650° C., and preferably less than about 500° C., for entering the coatings considered here, which gives more latitude in selecting the heat treatment and therefore good results more easily.)

2° The heat treatments which then have to be considered comply with the conditions below.

a) A first of these heat treatments comprises glazing, i.e. strong and short heating, in order to obtain melting of the surface or of the whole of the volume of the coating, followed by quenching in air. In order to relax the thermal stresses stemming from the quenching, glazing is continued with annealing at a temperature which is insufficient for producing oxidation of the substrate and which is typically less than 550° C. for a glassy transition temperature of 500° C. Glazing lasts for a few minutes, and annealing lasts for several hours. Glazing is conducted at a temperature close to 3/2 times the glassy transition temperature and which may be comprised between about 800° C. and 850° C. here.

b) Another possibility consists in a heat treatment with a single plateau at an intermediate temperature between that of the glazing and that of the annealing of the previous treatment. This intermediate temperature may be achieved between 650 and 700° C. As oxidation of the substrate and growth of the air bubbles in the coating have then to be feared, it is recommended to work in a closed enclosure. As the redox reaction between the substrate and the coating is not completely stopped, these heat treatments should not be prolonged excessively.)

3° The influence of other parameters will now be mentioned.

a) The methods for applying the coating may be a treatment by projection via a plasma, agglomeration and drying and application of a gel. The powders used preferably consist of homogeneous, spherical and fine grains (with a diameter of less than about 45 μm).

b) The ceramics may be alumina, mullite, alumina-rutile inter alia.

c) The glass with the low glassy transition temperature may be an ordinary industrial borosilicate glass.

d) One possibility consists of applying a sublayer on the substrate before projecting the ceramic. A sublayer may be used for improving the adhesiveness of the coating to the substrate. Nickel-based alloys make up the standard sublayers between steel and ceramics, but they were abandoned here because of their poor chemical resistance to nitrous compounds. Surprisingly, it was noticed that the application of a homogenous sublayer to the substrate (notably of stainless steel on stainless steel of a different grade) gave good results, in spite of the mismatching of the heat expansion coefficients, since the sublayer no longer has an expansion coefficient intermediate with those of the substrate and of the coating, like nickel alloys. The excellent adhesion resistance is then ascribed to the greater roughness of the sublayer than that of the substrate. The sublayer is advantageously projected via a plasma, like the coating. It may be of a steel grade other than that of the substrate (316L and 304L respectively for example).

II) A few tests will now be explained, those for which the results are satisfactory representing particular embodiments of the invention. They were all undertaken with a mixture of 30% by mass of alumina and 70% by mass of glass. The glass was an industrial glass of the brand Escol having a glassy transition temperature of 470° C., a heat expansion coefficient of $14.47 \times 10^{-6}$, a grain size between 32 and 45 micrometers, and a density of 2.626 (data from the manufacturer). The two essential properties of this glass are a low glassy transition temperature and a high expansion coefficient, but its chemical resistance to acids also makes it appreciated in actual uses.

The mixture was applied on round specimens in stainless steel 304L with a diameter of 25 millimeters and a thickness of 6 millimeters, a simple 45° chamfer is made on the edge (1×1 mm). The pour temperature of the mixture above which it may spread out under the effect of gravity forces and therefore seep into the pores is about 640° C.)

1° A first satisfactory test consisted of submitting the coating to glazing at 800° C. for 5 minutes followed by quenching in air and then by annealing at 480° C. for one hour, under an oxidizing atmosphere. An intermediate plateau was observed. A satisfactory, homogeneous and adherent coating was noticed on the specimen at the end of the process.

2° A second test was conducted substantially in the same way, but with glazing at a slightly different temperature (850° C.) for the same duration of 5 minutes and without any intermediate plateau. After annealing, cooling from 480° C. to 100° C. was gradually carried out within one hour. The aspect of the part is even better, with a still larger reduction in the edge effect.

Analogous comparative tests, but without annealing, gave very poor results because of significant delaminations leading to complete removal of the coating near the edges of the specimen, and significant increase in the roughness elsewhere. Also, other comparative tests conducted with annealing but with a larger proportion of alumina, exhibited significant delaminations at the edges, starting from 40% by weight of alumina.)

3° A third satisfactory test took place under an argon atmosphere and consisted of subjecting the specimen and the coating to a heat treatment at 700° C. for one hour with a rise in temperature of 5° C. per minute. Here also comparative tests were conducted. An increase in the proportion of alumina in the composition of the mixture gave even more marked flakings than under the conditions of the preceding tests. A repetition of the tests was also undertaken with a coating having the same composition but under an oxidizing atmosphere. Chemical alteration of the coating was then seen because of the oxidation of the substrate.

These three main tests gave coatings with a nice aspect and resistant to a breakdown voltage of 1,200 volts at 50 Hertz in a dry and humid (saline) medium.

Other tests were conducted at a temperature of 650° C. for 5 hours followed by annealing at 480° C. for 30 minutes. In all the cases, the opening and crossing porosity was decreased, but substrate reactions leading to its oxidation as well as to growth of the internal bubbles occurred.

The invention claimed is:

1. A method for coating steel sectors of a vitrification crucible, comprising:
    applying a mixture of glass and ceramic by projection via a plasma on the steel of the sectors, and wherein a stainless steel sublayer is applied by projection via a plasma on the substrate before the step of applying the glass and ceramic mixture; and
    subjecting the obtained coating to a heat treatment, the mixture having a mass composition of 50% to 70% of glass having a glassy transition temperature below 650° C., and of 30% to 50% of ceramic, and the heat treatment being conducted up to a maximum temperature which is greater than a pour temperature of the mixture, and comprised between 650° C. and 850° C.

2. The method for coating crucible sectors according to claim 1, characterized in that the heat treatment comprises:
    glazing conducted between 750° C. and 850° C. for a duration of at most 15 minutes; and
    further comprises annealing conducted at a temperature below the glassy transition temperature of the glass.

3. The method for coating crucible sectors according to claim 2, characterized in that the glass has a glassy transition temperature below 500° C.

4. The method for coating crucible sector according to claim 2, characterized in that the heat treatment comprises a single step conducted between 650° C. and 750° C. under an inert atmosphere.

5. The method for coating crucible sectors according to claim 2, characterized in that the heat treatment step lasts for at least one hour.

6. The method for coating crucible sectors according to claim 2, characterized in that the annealing step lasts for at least one hour.

7. The method for coating crucible sectors according to claim 1, characterized in that the mass composition of the mixture is 30% ceramic and 70% glass.

8. The method for coating crucible sectors according to claim 1, characterized in that the ceramic is selected from alumina, mullite and alumina-rutile.

\* \* \* \* \*